No. 895,717.  PATENTED AUG. 11, 1908.
M. A. BOLTENSTERN.
GAS MACHINE.
APPLICATION FILED AUG. 1, 1907.
5 SHEETS—SHEET 3.
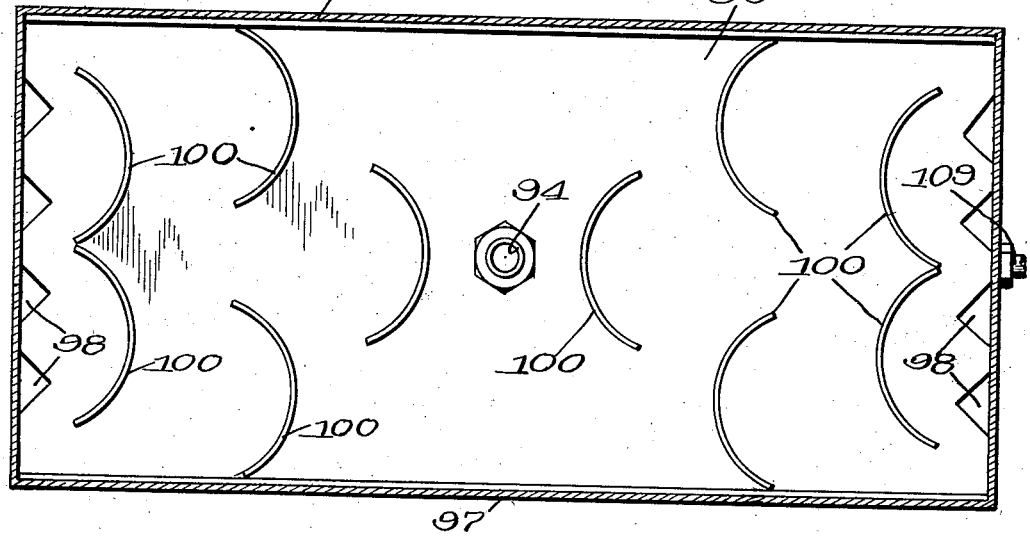
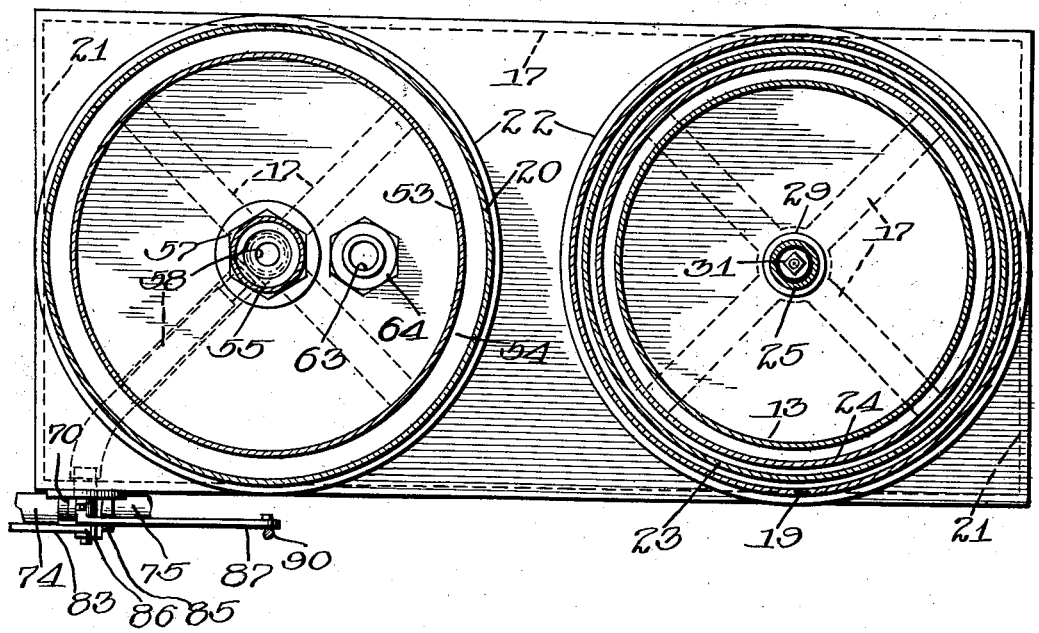

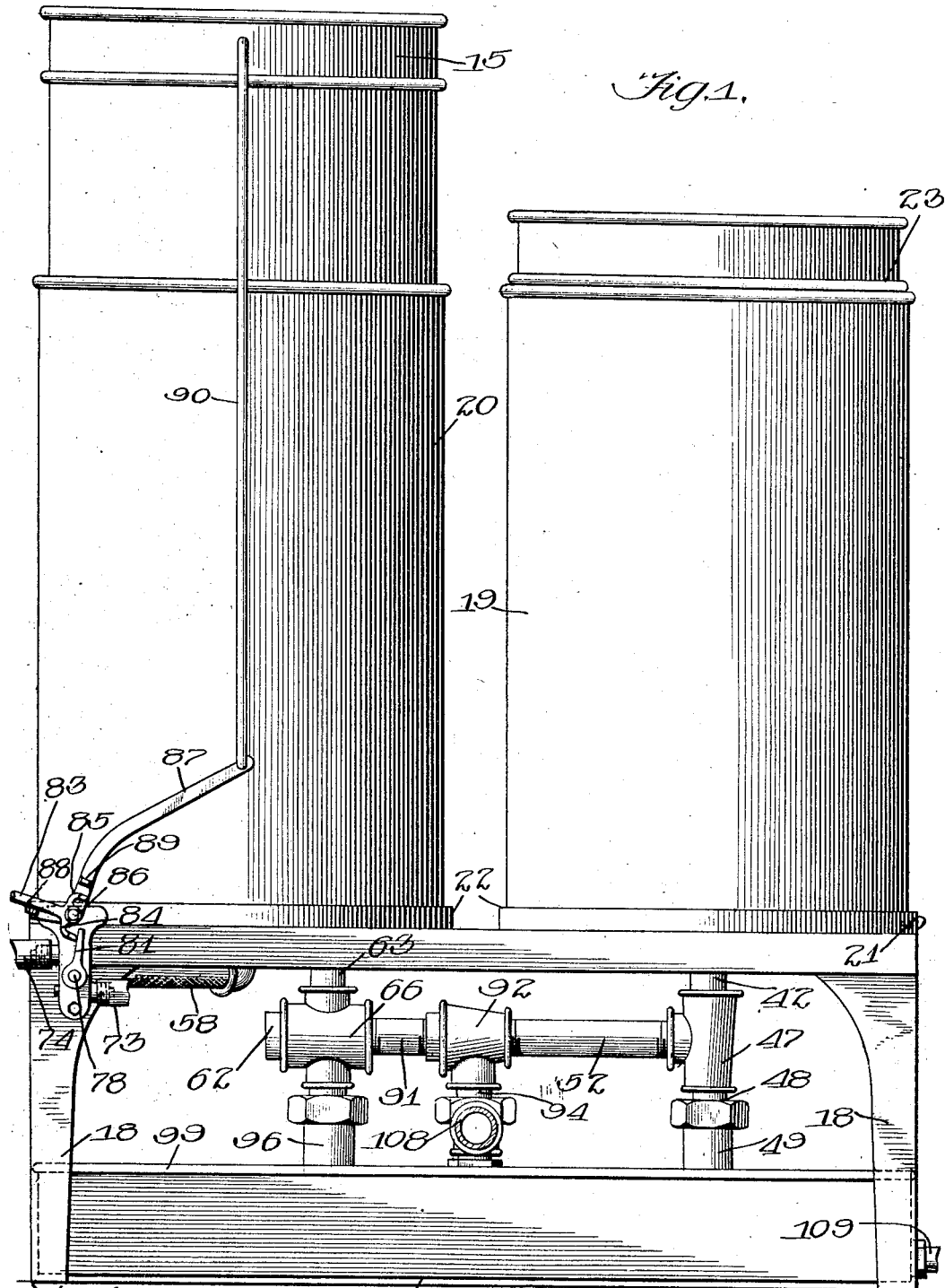

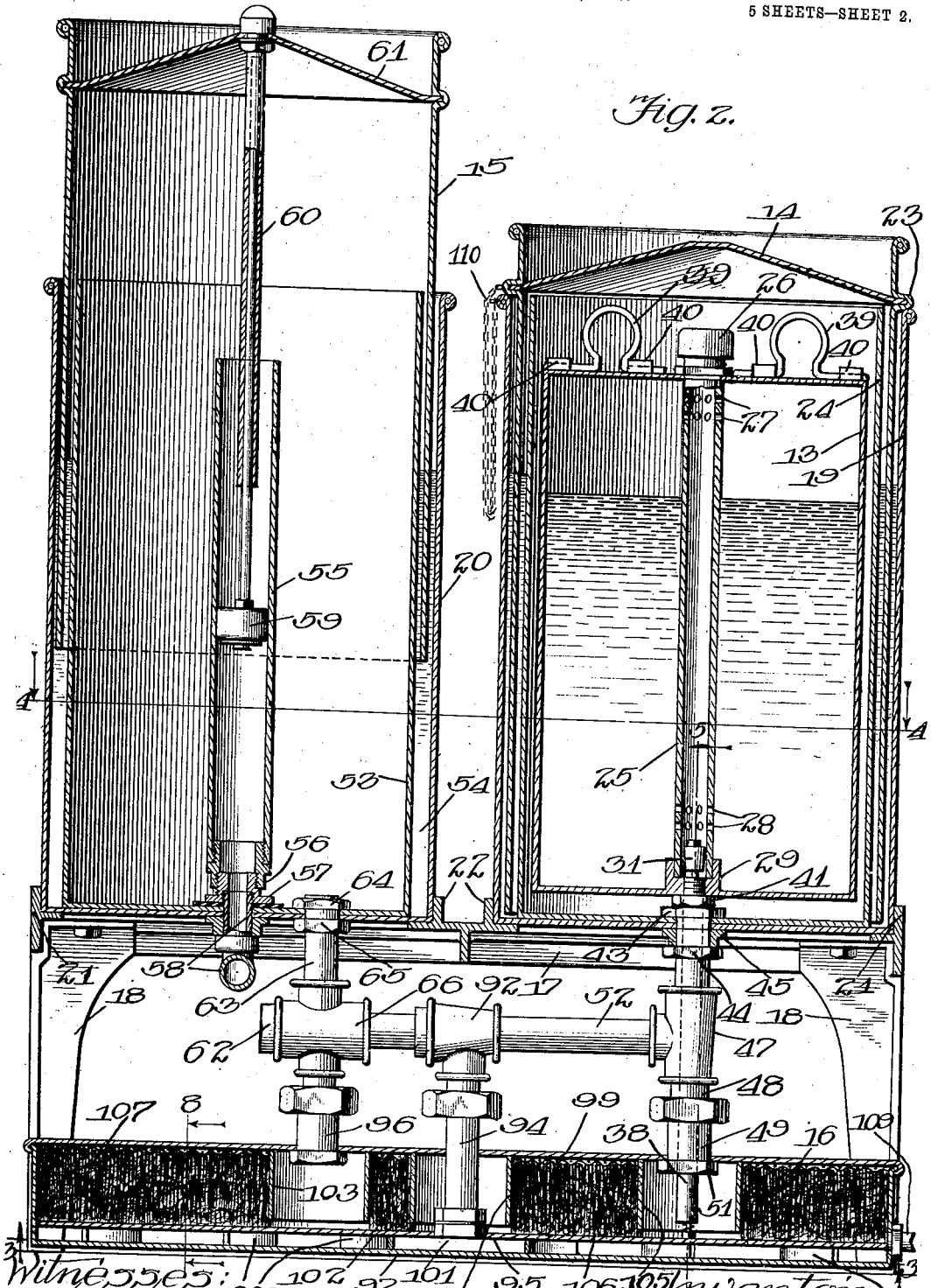

No. 895,717. PATENTED AUG. 11, 1908.
M. A. BOLTENSTERN.
GAS MACHINE.
APPLICATION FILED AUG. 1, 1907.
5 SHEETS—SHEET 4.
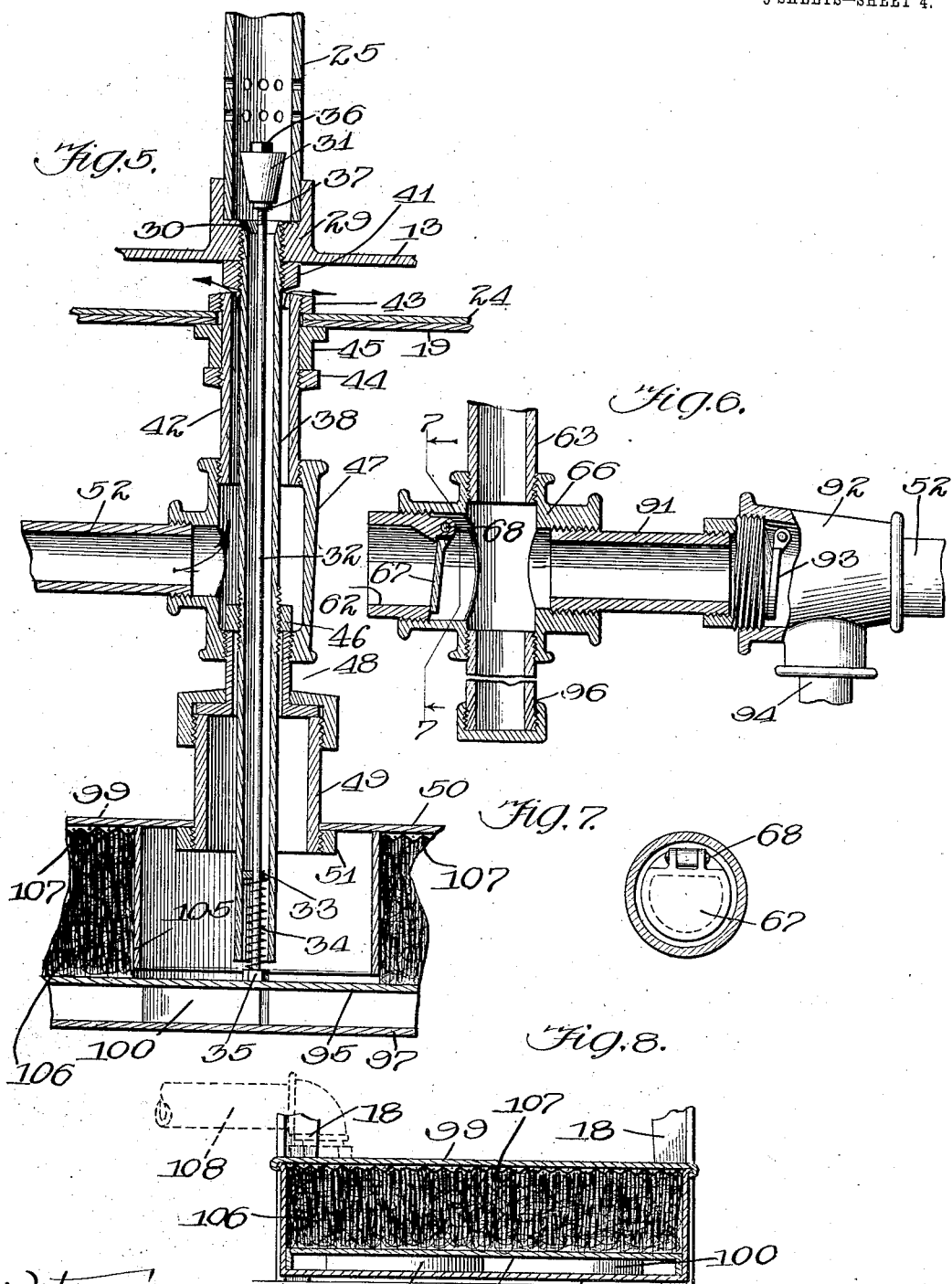

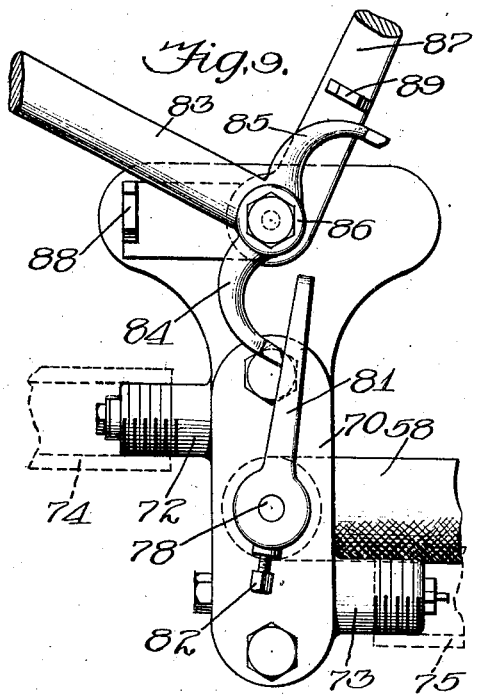
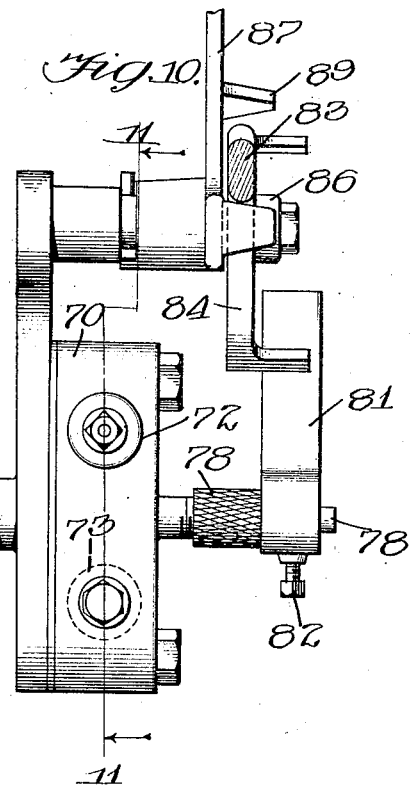
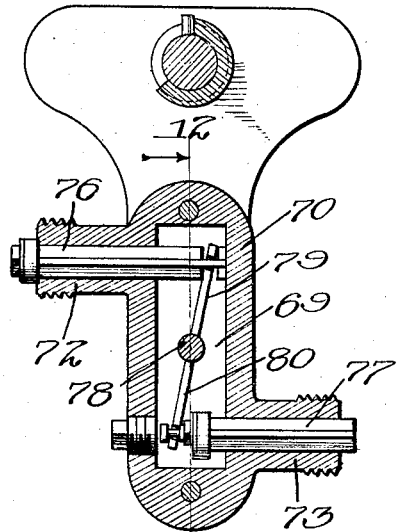
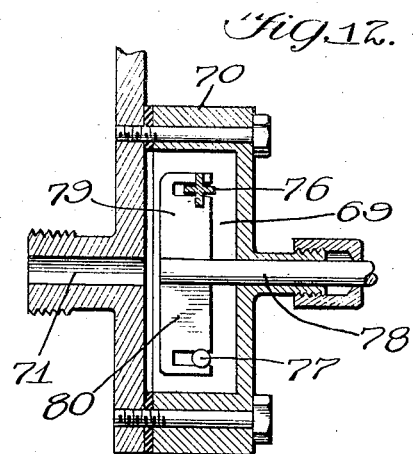

UNITED STATES PATENT OFFICE.

MORRIS A. BOLTENSTERN, OF LYNN CENTER, ILLINOIS.

GAS-MACHINE.

No. 895,717.    Specification of Letters Patent.    Patented Aug. 11, 1908.

Application filed August 1, 1907.  Serial No. 386,610.

*To all whom it may concern:*

Be it known that I, MORRIS A. BOLTENSTERN, a citizen of the United States, residing at Lynn Center, in the county of Henry and State of Illinois, have invented certain new and useful Improvements in Gas-Machines, of which the following is a specification, reference being had to the accompanying drawings.

My invention relates to machines for generating gas for use for domestic purposes, such as lighting, cooking, heating, etc., or for any other purpose for which gas may be required.

It has for its object to provide a new and improved apparatus by the use of which gas may be cheaply and satisfactorily generated from gasolene,—the apparatus being automatic in its operation so that the gas may be generated only when necessary to maintain the requisite supply, the quantity of gas generated being controlled by the rate of consumption. I accomplish this object as illustrated in the drawings and as hereinafter described.

What I regard as new is set forth in the claims.

In the accompanying drawings,—Figure 1 is a side elevation of my improved gas machine; Fig. 2 is a longitudinal vertical section thereof; Fig. 3 is an inverted horizontal section on line 3—3 of Fig. 2; Fig. 4 is a horizontal section on line 4—4 of Fig. 2; Fig. 5 is an enlarged partial vertical section on line 5—5 of Fig. 2; Fig. 6 is an enlarged detail, being a partial sectional view illustrating the connections between the air and gasolene tanks; Fig. 7 is a cross-section on line 7—7 of Fig. 6; Fig. 8 is a cross-section on line 8—8 of Fig. 2; Fig. 9 is an enlarged detail, illustrating the automatic valve which controls the admission of air to the air tank or reservoir; Fig. 10 is an edge view of the same; Fig. 11 is a sectional view on line 11—11 of Fig. 10; and Fig. 12 is a section on line 12—12 of Fig. 11.

My improved gas machine in the main comprises a gasolene tank or reservoir of greater or less capacity; an air reservoir or tank overlying the gasolene tank and arranged to supply air to the mixer or carbureter, where the air and gasolene are mixed in the proper proportion to produce the gas; an air-supplying tank which operates to supply air to the first-mentioned air tank or reservoir, and in conjunction with suitable mechanism operates to maintain the requisite supply of air in the air reservoir.

In addition to the above-mentioned parts my improved apparatus includes a mixing-chamber or carbureter, which receives gasolene from the gasolene tank and air from the air reservoir, and insures their mixture so that the gas delivered from the mixing chamber is suitable for its intended use. In the mixing chamber a quantity of wicking is provided which is suspended therein, the lower portion of the wicking being immersed in liquid gasolene so that it takes up the gasolene and becoming saturated therewith promotes its vaporization and mixture with the air. This is a particularly important feature of my invention, since by it I am able to insure the production of the proper mixture and, moreover, I am able to use up all the gasolene, leaving practically no waste. The mixing chamber is provided with an outlet pipe, through which the gas formed by the intermixture of the gasolene and air passes out for consumption.

Having briefly explained the principal parts and the general arrangement of the apparatus, I will now describe particularly the embodiment of my invention illustrated in the accompanying drawings.

Referring to the drawings,—13 indicates the gasolene tank; 14 the air reservoir; 15 the air-supplying tank; and 16 the mixing chamber or carbureter.

As best shown in Figs. 1 and 2, I employ a base or stand 17 on which the tanks are mounted, 18 indicating the legs of the base. The carbureter 16 is placed below the tanks and between the legs of the base, as shown, so that it is contained wholly within the base and thereby economizes space. The construction of the mixing chamber will be described in detail hereinafter. As shown in Fig. 2, the base or stand 17 supports two tanks 19—20 placed side by side and suitably secured in position,—the base being preferably provided with flanges 21—22 which form recesses to receive the lower ends of said tanks. The air reservoir 14, which is open at the bottom and closed at the top, fits into the tank 19. Said air tank is provided near its upper end with an annular bead or flange 23 which is adapted to rest on the upper edge of the tank 19 when said air reservoir is in its lowermost position, at which time the lower edge of said air reservoir is slightly above the bottom of the tank 19, as shown in Fig. 2. 24 indicates an inner tank slightly less in diameter than the air reservoir 14 and open at the top. Said tank 24 is fitted in the tank 19 concentrically therewith and coöperates with the outer tank 19 to form an annular water chamber which receives the lower portion of the air reservoir 14, serving as a water seal therefor. Instead of forming the water chamber in the manner described, any other suitable means of providing an inner partition may be employed. As shown in Fig. 2, the gasolene tank 13 fits within the inner tank 24, with which it is concentric. Said gasolene tank, however, is closed so that the gasolene therein contained cannot escape into said inner tank 24. 25 indicates a shaft, which rises centrally through the gasolene tank 13,—its upper end extending through the top of said gasolene tank where it is provided with a cap 26. Said pipe is provided near its ends with openings 27—28, as shown in Fig. 2. The pipe 25 is for use in filling the gasolene tank and also for admitting air to said tank to prevent the formation therein of a vacuum as the gasolene is consumed.

As best shown in Fig. 5, the lower end of the pipe 25 fits into a sleeve 29 having therein a valve seat 30 in which is adapted to be seated a valve 31 carried at the upper end of a valve-stem 32. The valve-stem 32 extends down far enough below the gasolene tank to adapt it to engage and rest upon the false bottom of the mixing chamber when the gasolene tank is in its normal position and the valve 31 is off its seat, as shown in Figs. 2 and 5. In other words, when the gasolene tank is in its normal or operative position the valve 31 is held up off its seat by reason of the fact that the valve-stem 32 rests upon and is held up by the false bottom of the mixing chamber. 33 indicates a guide for the lower end of the valve-stem 32, and 34 a spring, the upper end of which bears against the guide 33,—its lower end bearing against a nut 35 screwed upon the lower end of the rod 32, so that said spring acts to assist gravity in moving the valve 31 down upon its seat when the gasolene tank is lifted out of its normal position. The nut 35 further serves as a means of adjusting the operative length of the valve-stem 32 to vary the extent to which the valve 31 is raised from its seat when the gasolene tank is in operative position. This adjustment is increased by adjusting the position of the valve 31 on the stem 32, nuts 36—37 being provided above and below said valve for that purpose. 38 indicates a pipe which extends down from the bottom of the gasolene tank, the upper end of said pipe forming the valve seat 30. Said pipe extends down around the valve-stem 32 into the mixing chamber and serves to conduct gasolene from said tank into the mixing chamber. The guide 33 for the valve-stem 32 is secured in said pipe, as shown in Fig. 5. It will thus be seen that when the gasolene tank is in its normal position, the valve 31 being off its seat, gasolene may flow from said tank into the mixing chamber. When it is desired to remove the gasolene tank, or to replenish the supply of gasolene, the gasolene tank is lifted sufficiently to permit the valve 31 to close the outlet, the cap 26 removed and the tank filled through the pipe 25. For supporting the tank when so lifted I provide handles 39 fitted to slide radially in guides 40 on the top of the tank. The arrangement is such that by sliding the handles outwardly their outer ends may be caused to project beyond the upper edge of the tank 24 and the gasolene tank thereby be suspended upon said tank 24. It will be understood, of course, that before this can be done the air reservoir 14 must be removed, which may be accomplished by simply lifting it out of the tank 19.

41 indicates a nut fitted upon the pipe 38 immediately below the bottom of the tank 13, as shown in Fig. 5.

42 indicates a pipe which passes through the bottoms of the tanks 24 and 19 and is secured in position by nuts 43—44 and a flanged collar 45 shown in Fig. 5,—the collar 45 being placed below the bottom of the tank 19 and being held tightly in position by the nuts 43—44 which are screw-threaded on the pipe 42.

47 indicates a T-connection, the upper end of which is connected with the lower end of the pipe 42,—its lower end being connected by a suitable coupling 48 with a pipe 49 which projects through the top 50 of the mixing chamber, being connected therewith by means of a collar 51 secured upon the lower end of said pipe 49, as shown in Fig. 5. A tight connection is made between the pipe 49 and the mixing chamber so as to prevent the escape of gas. 52 indicates a pipe connecting with one side of the T-connection 47, as shown in Fig. 5. Said pipe is a supply pipe through which fresh air is admitted to the air reservoir 14.

46 indicates a nut threaded intermediately upon the pipe 38 so as to rest upon the upper end of pipe 48, as shown in Fig. 5. Said nut not only supports the weight of the reservoir 13 and serves as a means of regulating the distance from the lower end of the pipe 38 to the false bottom hereinafter described thereby regulating the depth of gasolene in the mixing chamber, but also serves as a valve to prevent air from passing downward through pipe 48. The nut 46 is so placed that the nut 41 is held out of engagement with the upper end of the pipe 42 so as to provide a free passage for air between said nut 41 and the upper end of the pipe 42.

Fresh air is automatically supplied to the air reservoir 14 through the air-supplying tank 15, as will now be described. As shown in Fig. 2, the air-supplying tank 15 is fitted concentrically within the tank 20, an inner tank 53 being placed in the tank 20 and within the lower end of the tank 15 so that a water chamber 54 is provided between tanks 20 and 53. This water chamber serves to seal the lower end of the air-supplying tank 15.

55 indicates a cylinder centrally mounted in the tank 53 and connected by suitable couplings 56—57 with a water pipe 58, best shown in Figs. 1 and 2. The pipe 58 serves to admit water to the cylinder 55, as will be hereinafter described, to force upward in said cylinder a piston 59 and thereby raise the air-supplying tank 15 which is connected with the piston 59 by means of a piston-rod 60 which rises from the piston 59 and is connected with the top 61 of the air tank 15. Obviously, when water under pressure is admitted to the cylinder 55 below the piston 59 it will force said piston up in said cylinder, thereby lifting the tank 15. The result is that air will be drawn into the air tank 15 and the tank 53, entering through air inlet pipes 62 and 63,—the latter opening into the tank 53 through the bottom thereof, as shown in Fig. 2. Nuts 64—65 above and below the bottom of said tank serve to hold the pipe 63 in position. The pipes 62 and 63 are connected by a +-coupling 66, the pipe 62 being disposed in a horizontal position, as shown. A check-valve 67 is provided at the inner end of the pipe 62, said valve being constructed and arranged as shown in Figs. 6 and 7, from which it will be seen that said valve is pivoted at its upper end, as shown at 68, so that it hangs pendulous. The valve seat is somewhat inclined from the perpendicular in such manner that when the valve 67 hangs freely it does not engage its seat, but pressure from within serves to seat it in the manner shown in Fig. 6. Thus the normal position of the valve is open but it closes as soon as any pressure develops which has a tendency to force air out through pipe 62. The advantage of thus arranging the valve is that it makes the use of counterbalancing weights unnecessary. When the air-supplying tank is lifted by water pressure, as described, air passes freely through pipes 62—63 up into said tank. As soon, however, as the weight of the tank 15 is sustained by the body of air within it, which is the case when the water pressure is withdrawn from the piston 59 and the water below it is permitted to exhaust, the weight on the tank 15 is sufficient to close the valve 67 preventing the escape of the air and directing it into other parts of the apparatus, as will hereinafter appear.

The operation of the piston 59 is controlled automatically by means of valve mechanism best illustrated in Figs. 1, 9, 10, 11 and 12. Such mechanism consists of a water chamber 69 provided in a suitable casing 70. Said water chamber is provided with an outlet 71 with which the pipe 58 connects and also with nipples 72—73 which communicate with opposite end portions thereof and connect with inlet and outlet pipes 74—75, respectively, as shown in Fig. 9.

76—77 indicate valves mounted, respectively, in the nipples 72—73.

78 indicates a rock-shaft mounted in the water chamber 69 and having arms 79—80 which respectively engage the valves 76—77 in such manner that by rocking the shaft 78 in one direction the valve 76 may be closed and the valve 77 opened, while by rocking the shaft in the opposite direction the valve 76 may be opened and the valve 77 closed. The valve 76 controls the admission of water to the water chamber 69, while the valve 77 is the exhaust valve and is used to permit the water to exhaust after it has performed its work in the cylinder 55. The valves 76—77 are preferably of the shape shown in the drawings, but they may be of any other suitable construction.

The shaft 78 extends out of the water chamber 69, as shown in Fig. 10, and carries an arm 81 adjustably secured thereupon, preferably by a set-screw 82, as shown in Fig. 9, so that it may be adjusted to stand at different angles. 83 indicates a lever having oppositely-disposed arms 84—85 forming a fork which embraces the upper end of the arm 81. Said shaft is pivotally mounted upon a stud 86 arranged above the arm 81 and adjacent thereto, the arrangement being such that by rocking the lever 83 in one direction or the other one or the other of its arms may be caused to strike the arm 81 and rock the shaft 78 so as to operate the valves 76—77. When the parts are in the position shown in Figs. 9 and 11, the valve 76 is closed and the valve 77 open. If, however, the lever 83 is rocked to the right, its arm 85 will strike the arm 81 on the right-hand side and throw it over to the left, thereby opening the valve 76 and closing the valve 77, thereby admitting water to the chamber 69 and cylinder 55 and forcing up the air-supplying tank 15. When the lever 83 is rocked in the opposite direction its arm 84 will strike the arm 81 on the left-hand side throwing it over to the right, thereby closing the valve 76 and opening the valve 77. This will shut off the supply of water from the chamber 69 and permit the water in the cylinder 55 below the piston to exhaust so that the weight of the air-supplying tank 15 will be sustained by the air therein. 87 indicates a lever also mounted on the stud 86 and extending at one side of the tank 20, as best shown in Fig. 1. Said lever is in the form of a bell-crank lever and is provided with lugs 88—89 which lie at opposite sides of the lever 83 and project into the plane thereof so that they are adapted to engage said lever.

90 indicates a rod which connects the outer end of the lever 87 with the air-supplying tank 15. The parts being in the position shown in Fig. 1, the arrangement is such that as the tank 15 descends by reason of the discharge of the air therein the lug 88 will engage and lift the lever 83, rocking it until it passes the vertical when it will fall to the other side, causing its arm 85 to strike the arm 81 and throw it over to the left, thereby admitting water to the water chamber 69 and cylinder 55, which, as has been explained, will force the piston 59 up and cause the tank 15 to take in a fresh supply of air. As the tank 15 is lifted by the admission of the water, the lever 87 will be rocked in the opposite direction, causing its lugs 89 to engage and rock the lever 83 to the left, and again when said lever passes the vertical it will fall over, this time to the left, causing its arm 84 to strike the arm 81 on the left-hand side and throw it to the right, thereby shutting the inlet valve 76 and opening the exhaust valve 77, which will permit the water below the piston 59 to exhaust and cause the weight of the tank 15 to be applied to the air therein. Thus the supply of air in the tank 15 is automatically replenished whenever necessary, but the air in the air-supplying tank is maintained under pressure equal to the weight of the tank except during the short time occupied in lifting the tank to refill it with air.

As shown in Figs. 2 and 6, the +-coupling 66 communicates with pipe 52 through a pipe 91 disposed opposite to the inlet pipe 62,— said pipe 91 communicating with a T-coupling 92 which also connects with the pipe 52. Said coupling 92 is provided with a check-valve 93 opposite the pipe 91,—said valve being similar to the valve 67 and similarly mounted. 94 indicates a pipe leading from the coupling 92 down through the false bottom 95 of the mixing chamber. 96 indicates a pipe connecting the coupling 66 with the upper portion of the mixing chamber,—said pipe being similar to the pipe 49. The pipe 96 is normally closed by means of a cap as shown in Fig. 6, being provided so that if desired an additional gas tank substantially similar to reservoir 13 may be placed in the tank 53. In such case, the arrangement would be substantially the same as that of the reservoir 13 and connections.

The construction of the carbureter chamber is best shown in Figs. 2, 3 and 8. As therein shown the false bottom 95 is set a short distance above the true bottom 97,— the side edges of the false bottom fitting closely against the sides of the mixing chamber, as shown in Fig. 8. At the ends of the false bottom are provided notches 98 which afford communication between the spaces above and below the false bottom. 99 indicates the top of the mixing chamber which fits closely so as to be gas tight. 100 indicates a series of deflectors or baffle-plates placed between the two bottoms of the mixing chamber. They serve to cause the air admitted to the space 101 below the false bottom through pipe 94 at the center to follow a circuitous route in passing to the ends of the false bottom, where it rises to the space 102 above the false bottom. 103—104—105 indicate depending annular deflectors secured to the top plate of the mixing chamber around each of the pipes 96, 94 and 49, respectively, and extending down to near the false bottom, as shown in Figs. 2 and 5. 106 indicates wicking suspended in the mixing chamber preferably from a wire frame 107, or other suitable suspending device. A sufficient quantity of wicking is used to practically fill the space in the chamber 102, but it is not packed together so tightly as to prevent a comparatively free circulation of air therethrough. The object of the wicking is to take up the gasolene in the chamber and becoming saturated with it by capillary attraction to promote its vaporization and mixture with the air supplied through the air pipes. The lower end of the pipe 38 terminates a short distance above the false bottom 95 so that when the mixing chamber contains sufficient gasolene to seal the lower end of said pipe 38 the admission of further gasolene is prevented. Thus the upper part of the mixing chamber is left free for the circulation of air therethrough except for the presence of the gasolene-saturated wicking. The result is that the air admitted to the mixing chamber is quickly and thoroughly brought into association with vaporized gasolene. Moreover, the wicking takes up practically all the gasolene, leaving no waste, so that it not only operates very expeditiously and efficiently, but also is exceedingly economical. As soon as sufficient gasolene is consumed to lower the level below the lower end of the pipe 38 a fresh supply of gasolene is automatically admitted from the gasolene reservoir so that the gas-making operation continues until the supply of gasolene in the reservoir 13 is consumed. 108 indicates an outlet pipe which communicates with the mixing chamber for conducting the gas therefrom. 109 indicates a pipe which communicates with the lower portion of the mixing chamber for discharging the liquid contents thereof when necessary. 110 indicates a chain connecting tanks 14 and 19 to prevent the air reservoir from being forced up high enough to break the water seal.

My improved apparatus is adapted for use in generating gas from ether gasolene, alcohol, or any other suitable material, and it should be understood that while I have described the apparatus as being used in connection with gasolene my invention is not restricted to such use. Furthermore, while I prefer to employ water pressure to raise the piston 59 and replenish the air supply, any other suitable fluid may be employed,—such, for example, as air.

The arrangement of the several tanks and mixing chamber or carbureter is compact and efficient, particularly where the number of lights required is not extraordinarily large, but it will of course be understood that my invention, generically speaking, is not restricted to arranging said tanks and carbureter on a single base, nor in the positions shown, as they may be disposed in any other suitable manner, so long as the operation of the parts is not interfered with. The specific arrangement possesses important advantages, however, which are pointed out in the specific claims, which are hereinafter made.

That which I claim as my invention, and desire to secure by Letters Patent, is,—

1. A gas-machine, comprising a gasolene reservoir, an air reservoir enveloping said gasolene reservoir, said air reservoir having a rising and falling bell, an air-supplying tank having a rising and falling bell, a pipe connecting said air-supplying tank and air reservoir, means for maintaining a supply of air in said air-supplying tank and for delivering air to said air reservoir, a mixing chamber below said reservoirs, a pipe connecting said gasolene reservoir with said mixing chamber, a pipe connecting said first-mentioned pipe with the mixing chamber, and a check-valve for causing air from said air reservoir to flow into said mixing chamber.

2. A gas-machine, comprising a gasolene reservoir, an air reservoir enveloping said gasolene reservoir, said air reservoir having a rising and falling bell, an air-supplying tank having a rising and falling bell, a pipe connecting said air-supplying tank and air reservoir, means for maintaining a supply of air in said air-supplying tank and for delivering air to said air reservoir, a mixing chamber below said reservoirs, a pipe connecting said gasolene reservoir with said mixing chamber, a pipe connecting said first-mentioned pipe with the mixing chamber, and a check-valve for causing air from said air reservoir to flow into said mixing chamber, said mixing chamber having a quantity of wicking suspended therein.

3. A gas-machine, comprising a gasolene reservoir, an air reservoir enveloping said gasolene reservoir, said air reservoir having a rising and falling bell, an air-supplying tank having a rising and falling bell, a pipe connecting said air-supplying tank and air reservoir, means for maintaining a supply of air in said air-supplying tank and for delivering air to said air reservoir, a mixing chamber below said reservoirs, said mixing chamber having a false bottom, a pipe connecting said gasolene reservoir with said mixing chamber, a pipe connecting said first-mentioned pipe with the false bottom of the mixing chamber, and a check-valve for causing air from said air reservoir to flow into said mixing chamber.

4. A gas-machine, comprising a gasolene reservoir, an air reservoir enveloping said gasolene reservoir, said air reservoir having a rising and falling bell, an air-supplying tank having a rising and falling bell, a pipe connecting said air-supplying tank and air reservoir, means for maintaining a supply of air in said air-supplying tank and for delivering air to said air reservoir, a mixing chamber below said reservoirs, said mixing chamber having a false bottom, a pipe connecting said gasolene reservoir with said mixing chamber, a pipe connecting said first-mentioned pipe with the false bottom of the mixing chamber, wicking suspended therein above the false bottom, and a check-valve for causing air from said air reservoir to flow into said mixing chamber.

MORRIS A. BOLTENSTERN.

Witnesses:
VICTOR F. BOLTENSTERN,
GEO. H. McCLUNY.